(12) United States Patent
Brown

(10) Patent No.: US 6,820,566 B2
(45) Date of Patent: Nov. 23, 2004

(54) MEANS OF PROVIDING ADDITIONAL MODULAR ARMOR PROTECTED BUOYANCY TO TRACKED AND WHEELED VEHICLES

(75) Inventor: James D. Brown, Pleasanton, CA (US)

(73) Assignee: United Defense LP, Arlington, VA (US)

( * ) Notice: Subject to any disclaimer, the term of this patent is extended or adjusted under 35 U.S.C. 154(b) by 0 days.

(21) Appl. No.: 10/309,680

(22) Filed: Dec. 3, 2002

(65) Prior Publication Data

US 2003/0172863 A1 Sep. 18, 2003

Related U.S. Application Data

(60) Provisional application No. 60/337,440, filed on Dec. 3, 2001.

(51) Int. Cl.$^7$ .............................................. B63B 43/14
(52) U.S. Cl. ...................................... 114/123; 440/12.5
(58) Field of Search ........................... 114/123, 68, 69; 440/12.5

(56) References Cited

U.S. PATENT DOCUMENTS

| | | | | |
|---|---|---|---|---|
| 1,448,607 A | * | 3/1923 | Tworkski | 114/68 |
| 1,703,816 A | * | 2/1929 | Fiore | 114/336 |
| 2,453,149 A | * | 11/1948 | McCutchen | 114/9 |
| 2,514,488 A | * | 7/1950 | Hale et al. | 440/12.58 |
| 4,988,438 A | * | 1/1991 | Eddleman | 210/242.3 |
| 5,113,779 A | * | 5/1992 | Amrein et al. | 440/12.63 |
| 2002/0025734 A1 | * | 2/2002 | Redman | 440/12.5 |

* cited by examiner

Primary Examiner—Stephen Avila
(74) Attorney, Agent, or Firm—Patterson, Thuente, Skaar & Christensen, P.A.

(57) ABSTRACT

An armor-protected buoyancy module is installed in multiple unit sets on tracked or wheeled vehicles to provide the vehicles with amphibious capability. The buoyancy modules can be lifted by two men without additional material handling equipment. The buoyancy modules are attached to fixed mounting devices that are mounted on the subject vehicle. Existing armor elements may be present to serve as the mounting devices. The armor shell provided for the buoyancy module protects it in both the deployed and stowed configurations.

8 Claims, 4 Drawing Sheets

MEANS OF PROVIDING ADDITIONAL MODULAR ARMOR PROTECTED BUOYANCY TO TRACKED AND WHEELED VEHICLES

Applicant claims priority of U.S. provisional application Ser. No. 60/337,440, filed Dec. 3, 2001.

BACKGROUND OF THE INVENTION

1. Field of the Invention

The present invention relates generally to buoyancy devices for vehicles, and more particularly is an armor-protected buoyancy module. One or more of the buoyancy modules are installed on tracked or wheeled military vehicles to provide the vehicles with the ability to float.

2. Description of the Prior Art

Military vehicles are sometimes called upon to ford inland waterways, either because of the absence of bridges, or because of the inadequacy of existing bridges to carry heavy military vehicles. Most wheeled and tracked vehicles are not inherently amphibious. Some designs for vehicles which were originally amphibious (e.g., Bradley, M113) have been modified with additional armor and therefore no longer have sufficient flotation for safe water crossings. Due to the not infrequent need for military vehicles to cross water, amphibious capabilities are very desirable. Military vehicles have previously been made amphibious by one of four methods; (a) inherent design, (b) use of an erectable swim curtain, (c) use of pontoon structures, or (d) addition of inflatable appendages.

The inherent design of vehicles such as the AAV7 (tracked amphibian for US Marine Corps), the BMP-1 (infantry squad carrier for former Soviet Union), the PT-76 (amphibious light tank for former Soviet Union), and the DUKW (2½ ton truck for US Army and Marines) provided amphibious capability for these vehicles. However, in order to provide the amphibious capability, one or more of the following design tradeoffs were required: increasing overall size to provide sufficient water displacement (as in the case of the AAV7), adding undesirable front glacis angles (as with the BMP-1), utilizing ineffectively thin armor (PT-76), or sacrificing land mobility (DUKW). Due to these required design concessions, the land performance of vehicles designed to be amphibious has historically been compromised to some extent in exchange for their amphibious capabilities.

Erectable swim curtains were first tried on the "Duplex Drive" Sherman tanks used in the Normandy invasion. The "DD" kit consisted of an erectable upper frame connected to a rubberized canvas bellows whose bottom end was secured to the tank. The overall effect was similar to an accordion laid on its side. The DD modification had the disadvantage that the driver had no vision to the front. Additionally, the bellows was fragile, and subject to damage from either shell fragments or blast effect, as well as dynamic loading from wave impacts. Due to the fact that the bellows was not compartmentalized, damage to any portion of the curtain could result in flooding of the entire vehicle. Of an entire battalion fitted for the invasion, not a single tank made it to the beach.

Rigid pontoon kits have been tried by several countries. Disadvantages of such kits include:

a) Transport required to move the kit when it is not mounted. Use of such kits entails considerable logistic burden in forward areas.

b) Disclosure of operational intention by the presence of the kits in forward areas.

c) Time required to mount the kit.

d) Material handling equipment (cranes and jacks) required to mount the kit.

e) Ability to ingress and egress steep banks. In inland waters, the bow and stern of the pontoon kit may contact the bank and prevent forward progress. Additionally, currents tend to swing the vehicle around once either end is in contact with the bank.

f) Limitation of ground mobility before and immediately after the crossing. Turning radius and ground clearance are severely limited. Width of the vehicle may be a serious limitation in wooded assembly areas.

g) Time required to remove the kit after the crossing.

h) Transport, time, and specialized equipment required to recover the kit for reuse. If kits cannot be reused, a kit must be supplied for each vehicle in the crossing unit. New kits must be provided before a second crossing operation can be undertaken.

In general, pontoon kits are simply unsuitable for use by reconnaissance units, who habitually operate away from their parent organizations and are therefore separated from the logistical support inherently required for the use of pontoons. Unfortunately, these reconnaissance units are precisely the ones most likely to require amphibious capability.

Finally, U.S. military designers have most recently turned to the use of inflatable pontoon appendages. A kit for the M113 family of vehicles was tested in 1995. This kit consisted of rubberized cylindrical pontoons that attached to the sides and front of the vehicle. The pontoons were connected to the vehicle by a manifold fed by a centrifugal air compressor (modified engine turbocharger) which was powered by a gasoline engine. The compressor and manifold were required to inflate the pontoons and to provide makeup air to compensate for leaks. A principal shortcoming of the pontoon system is the logistical burden associated with transporting the pontoons, compressor, manifolding, and auxiliary gasoline engine when they are not in use. The deflated pontoons interfere with operation of the vehicle on land, so the kit must be fitted immediately before a swim operation and removed immediately thereafter.

Accordingly, it is an object of the present invention to provide a buoyancy additive device to provide amphibious capability to a vehicle that does not require modification of the basic design of a vehicle.

It is a further object of the present invention to provide a flotation aid device that does not impair the vision of the operators of a vehicle.

It is a still further object of the present invention to provide a flotation aid device that has armor protection of the buoyancy modules.

It is another object of the present invention to provide a flotation aid device that does not require independent transport.

SUMMARY OF THE INVENTION

The present invention is an armor-protected buoyancy module that is installed on tracked or wheeled vehicles to provide the vehicles with amphibious capability. The buoyancy modules are of such a size so that they can be lifted by two men without additional material handling equipment. The buoyancy modules are attached to fixed mounting devices that are mounted on the subject vehicle. Existing armor elements may be present to serve as the mounting devices for the buoyancy modules. The modules are hinged at a top side to swing open when they are deployed by pressurization, and latched at a bottom side to secure the modules when they are stowed. An armor shell provided for the buoyancy module protects it in both the deployed and stowed configurations.

An advantage of the present invention is that the buoyancy module can be used on nearly any vehicle for which amphibious capability is desired.

Another advantage of the present invention is that the armor protects the bellows, both when the device is deployed and when it is stowed.

A still further advantage of the present invention is that it does not require independent transport means.

Another advantage of the present invention is that the inherent compartmentalization of the modules ensures damage tolerance from enemy fire. A damaged module does not compromise the buoyancy of an adjoining module.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
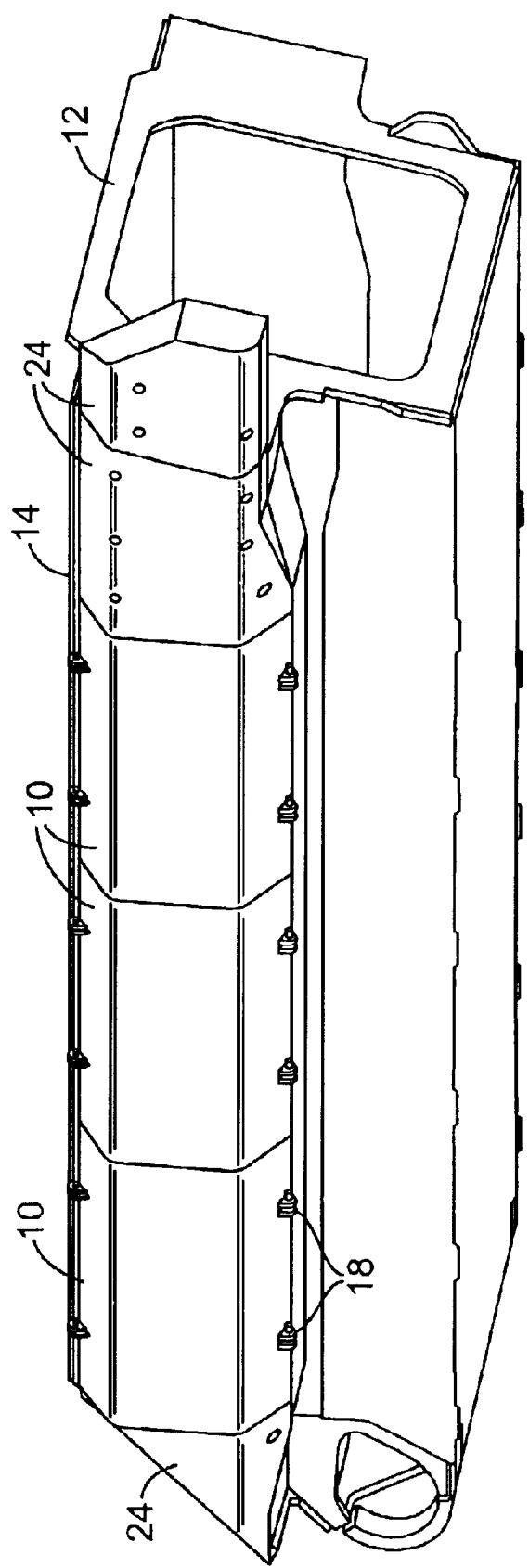
FIG. 1 is a perspective view of an amphibious vehicle with the buoyancy modules of the present invention installed.
Figure 2:
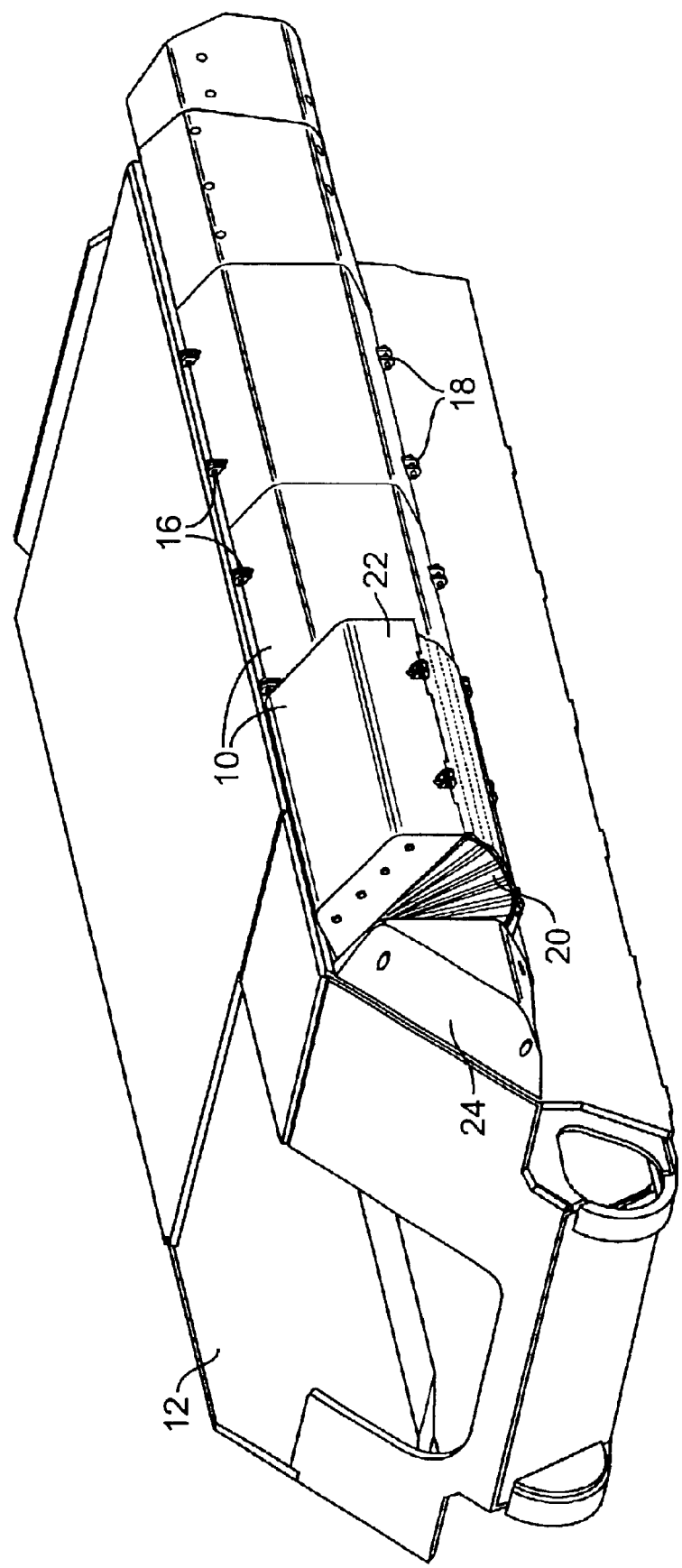
FIG. 2 is a perspective view of an amphibious vehicle with one of the buoyancy modules deployed.
Figure 3:
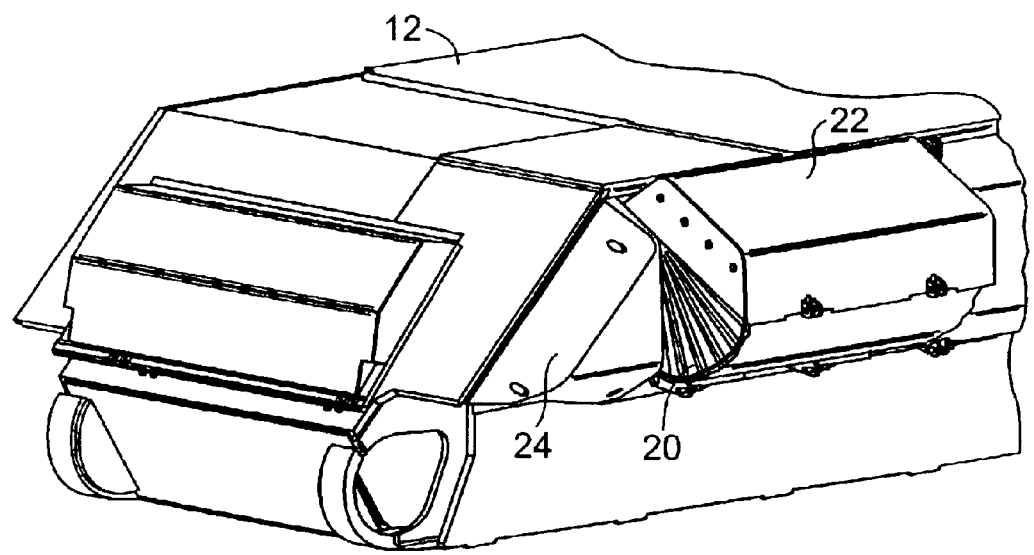
FIG. 3 is a more detailed view of a deployed buoyancy module.
Figure 4:
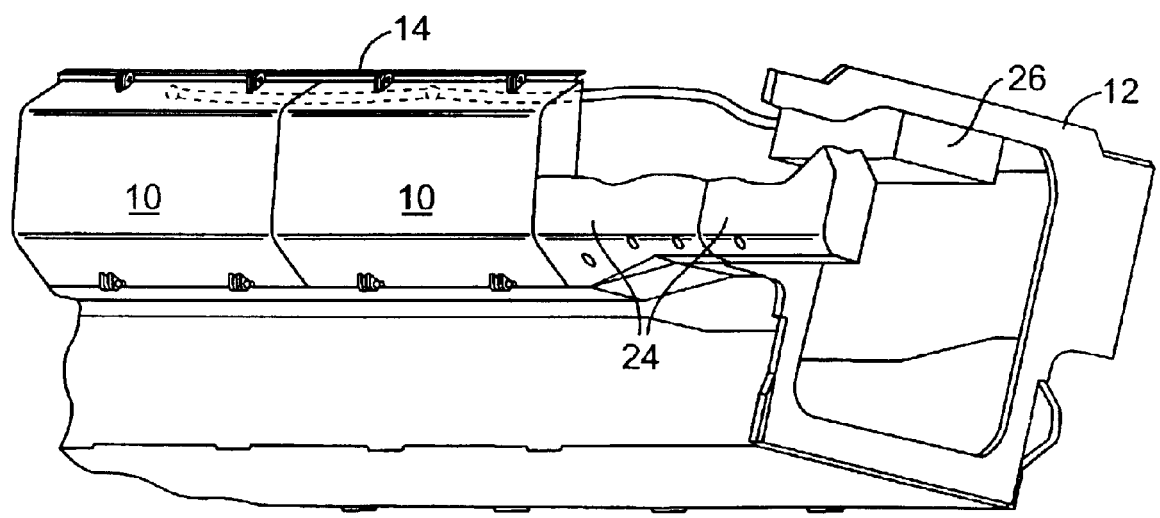
FIG. 4 shows the independent air supplies for the individual modules.
Figure 5:
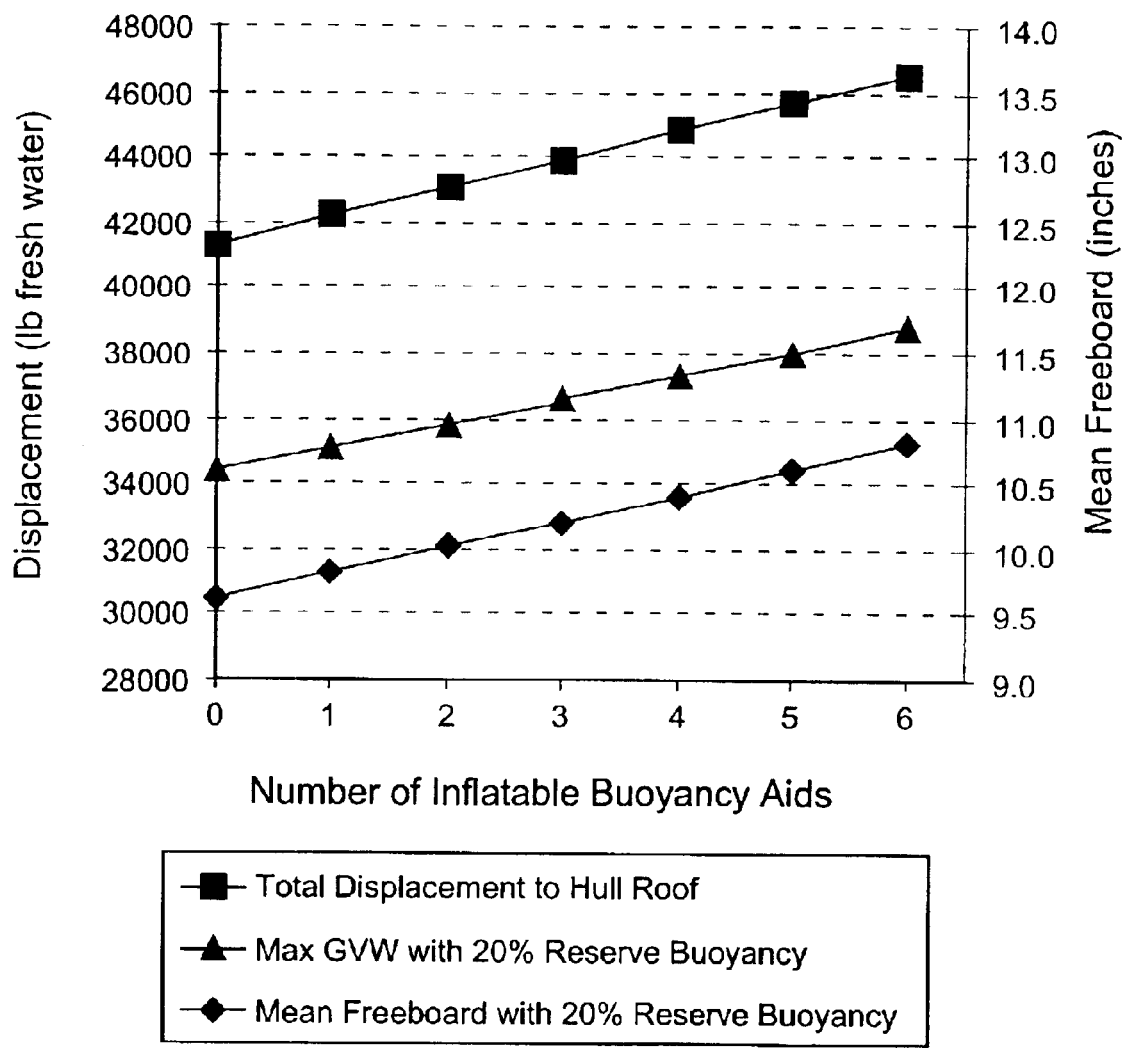
FIG. 5 is a graph demonstrating the additional buoyancy provided by the modules of the present invention.

The present invention is a buoyancy module 10 that is attached to a tracked or wheeled vehicle 12 to provide the vehicle 12 with amphibious capability. One or more of the buoyancy modules 10 can be installed on the vehicle 12 either as original equipment or as a retrofit addition. The buoyancy modules 10 are of such a size so that they can be lifted by two men without additional material handling equipment.

The buoyancy modules 10 are attached to fixed mounting bases 14 that are mounted on the subject vehicle 12. Existing armor elements may be present to serve as the mounting bases 14 for the buoyancy modules 10. Each module 10 includes at least one hinge 16 on a top side, and at least one securing latch 18 on a bottom side.

The buoyancy of the module 10 is provided by inflation of a bellows-like air chamber 20. The air chamber 20 is formed from a flexible air-tight material. When a buoyancy module 10 is to be deployed, the module 10 is pressurized. As the buoyancy module 10 inflates, the module 10 expands and swings outward on the hinge 16. When the buoyancy module 10 is not in use, the securing latch 18 is fastened to secure the module 10 in a stowed position.

To protect the air chamber 20 from damage, an armor shell 22 is provided on the exterior of the buoyancy module 10. The armor shell 22 protects the buoyancy module 10 in both deployed and stowed configurations. The contour of the armor shell 22 can be varied for signature management and to conform to the shape of the hull of the vehicle 12. The degree of armor protection can be adjusted to suit the particular vehicle. When in the closed position, the modules 10 look like add-on armor, and hence do not disclose the amphibious capability of the vehicle 12. When the buoyancy modules 10 are deployed, the armor shell 22 provides protection against small arms and mortar fire, which may be used to oppose the water crossing of the vehicle 12.

A protective cowling 24 can be added at the front or rear (or both) of a row of buoyancy modules 10 to protect the intermediate modules 10 from brush and tree limb damage on land. The protective cowling 24 also serves to streamline the vehicle 12 in the water.

The buoyancy modules 10 are inflated by a centralized manifold 26, which can control the degree of inflation of individual modules 10. Individualized inflation pressure control of the modules 10 is needed to adjust the overall buoyancy of the vehicle 12 for varying load weight and center of gravity conditions. This feature becomes particularly important for vehicles 12 in which the personnel, cargo, or ammunition loads vary significantly from one use to another.

The buoyancy modules 10 require only a low-pressure air supply (3 to 4 PSI) for inflation. This eliminates the need for any source of high-pressure air. On vehicles permanently equipped with the buoyancy modules 10 of the present invention, the air supply required for inflation of the modules 10 can be fed from the turbocharger or turbine bleed air. For temporary installations, a 28V DC compressor or SCUBA bottles can be used to inflate the modules 10.

For security during land travel, the latches 18 on the bottom edges of the buoyancy modules 10 are secured. Prior to water operation, the latches 18 are released. However, the modules 10 need not be inflated until the vehicle 12 actually enters the water. This feature is useful because it preserves the land mobility of the vehicle 12 in crowded staging areas, and does not disclose the intent to conduct a water crossing until the vehicles 12 are actually in the water. This feature also increases the possibility of being able to use partially destroyed bridges as ingress or egress ramps, because vehicle width is not increased until the vehicle 12 is in the water.

The flexibility of the buoyancy system of the present invention due to the independent inflation control of the individual modules 10 is particularly important when the depth of a water obstacle is not known in advance. A body of water may appear to be fordable, but in reality be far too deep to traverse. The buoyancy modules 10 can be deployed after a crossing has been commenced if it becomes evident that the depth of the water will be greater than can be forded. Similarly, the buoyancy modules 10 can be deflated and stowed in mid-crossing if the water depth becomes shallow enough to resume travel by means of tracks or wheels. This feature is particularly valuable in swampy or flooded areas, where the vehicle 12 will be required to swim intermittently.

The flexibility provided by the individual inflation of buoyancy module 10 can also be critical during egress, as the buoyancy modules 10 can be sequentially deflated to provide traction for the vehicle 12 to climb out of the water. A significant shortcoming of all other methods is that the buoyancy of the vehicle reduces the weight borne on the tracks or wheels as the vehicle nears the bank. Amphibious vehicles not equipped with the sequentially deflatable buoyancy modules 10 of the present invention may therefore be unable to egress steep banks.

The buoyancy module 10 are automatically stowed by the weight of the armor shell 22 whenever pressure is released. The crew need not dismount immediately upon egress. The latches 18 can be secured at any convenient time. The bellows construction of the air chambers 20 ensures that the flexible material will be neatly stowed within the armor shell 22.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A method of providing supplemental buoyancy to a vehicle comprising the steps:
    a) constructing a plurality of modular air chambers, said modular air chambers including a pleated buoyancy unit operably connected to an independent inflation pressure control and an armored shell,
    b) mounting said modular air chambers along a length of said vehicle, said chambers being separated vertically,
    c) mounting a central manifold operably connected to each of the modular air chambers, and
    d) providing command means for selectively inflating and deflating individually each of said modular air chambers.

2. The method of claim 1 wherein:
    said modular air chamber is mounted on said vehicle with an upper hinge, said upper hinge allowing said armored shell of the modular air chamber to pivot from a stowed position to a deployed position when said pleated buoyancy unit is inflated.

3. The method of claim 1 wherein:
    each armored shell completely encompasses the pleated buoyancy unit when in a stowed position.

4. The method of claim 3 wherein:
    weight of said armored shell is sufficient to urge said pleated buoyancy unit from a deployed position to a stowed position when said pleated buoyancy unit is deflated.

5. The method of claim 3 wherein:
    a latch is provided to affix said armored shell to said vehicle when said pleated buoyancy unit is deflated.

6. The method of claim 1 wherein:
    at least one forward armored cowling is attached to said vehicle to protect an exposed forward face of a first modular air chamber and at least one aft armored cowling is attached to said vehicle to protect an exposed aft face of a last modular air chamber.

7. The method of claim 1 wherein:
    said command means directs said independent inflation pressure control system to maintain a uniform vehicle freeboard to correspond to a vehicle weight distribution.

8. The method of claim 1 wherein said command means directs said independent pressure control system to move a vehicle center of gravity along a horizontal axis to correspond to a vehicle traction requirement.

* * * * *